UNITED STATES PATENT OFFICE.

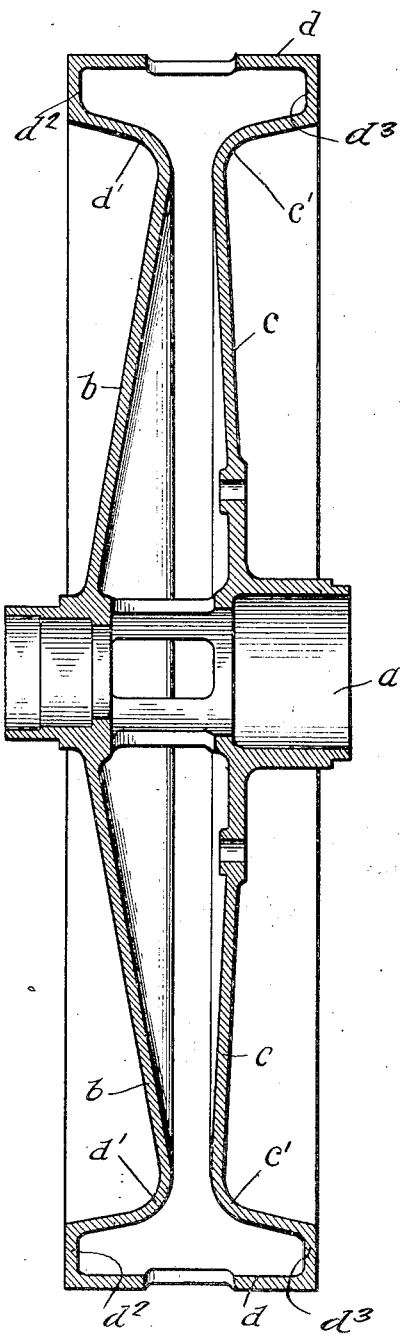

ROBERT J. BURROWS AND EDWIN B. ROSS, OF BUCHANAN, MICHIGAN, ASSIGNORS OF ONE-HALF TO CELFOR TOOL COMPANY AND ONE-HALF TO BUCHANAN ELECTRIC STEEL COMPANY, BOTH OF CHICAGO, ILLINOIS, CORPORATIONS OF ILLINOIS.

WHEEL.

1,131,819.      Specification of Letters Patent.      Patented Mar. 16, 1915.

Application filed June 13, 1913. Serial No. 773,408.

*To all whom it may concern:*

Be it known that we, ROBERT J. BURROWS and EDWIN B. ROSS, both citizens of the United States, residing at Buchanan, in the county of Berrien and State of Michigan, have invented certain new and useful Improvements in Wheels, of which the following is a specification.

This invention relates to improvements in wheels, and particularly in wheels designed for sustaining heavy loads, as is the case with wheels used on automobile trucks and similar heavy road vehicles.

It is the object of the invention to produce a strong metal wheel having the maximum amount of strength with the least amount of weight, and in which any tendency of shrinkage of the metal will be so counteracted or provided for as to obviate any cracking or any distortion of the wheel as a whole.

These objects we accomplish as illustrated in the drawing and hereinafter specifically pointed out.

That which we believe to be new will be set forth in the claims.

In the drawing, the illustration is a central cross-section through our improved wheel.

In the illustration we have shown our invention embodied in a cast metal wheel especially designed for use as the rear wheel of a heavy truck. The wheel illustrated comprises a hub portion $a$ and a rim $d$, the outer face or tread portion of which is adapted to receive and have secured thereto a suitable tire, not shown, said rim having substantially radial or inwardly-projecting flanges $d^2$—$d^3$ at its marginal portions, so that the rim portion as a whole is channel-shaped, and an intermediate connecting member, which, in the illustration, is composed of two separated web portions $b$—$c$ which extend out from the hub and are provided with oppositely-curved portions $d'$—$c'$ which connect with the inner marginal portions of said flanges $d^2$—$d^3$, thus forming a box-like rim structure. The webs $b$ and $c$ in this form of the invention are spaced a distance apart, inclining slightly toward each other, so that where they curve outward adjacent to the rim to merge into the inner margins of the flanges $d^2$—$d^3$ they are substantially equidistant from the edges of the wheel, and hence are properly positioned with respect to the rim portion to afford it the required support.

The openings shown in the box-like rim admit of the removal of the core after the casting operation. The curving outward of the two webs, as above referred to, is indicated by $c'$ and $d'$, respectively, and the curved sections so indicated contribute greatly to the commercial success and value of the wheel, due to the fact that shrinkage strains that would tend to distort the wheel as a whole are practically eliminated because such strains will exert their force at such curved sections and the slight distortion there produced will not affect the true running qualities of the wheel. These curved sections serve, therefore, by yielding to the shrinkage strains, to save the wheel from being subjected to such stresses as frequently lead to cracks or breaks, as in the case of metal wheels with spokes whose ends are unyieldingly held in the hub and rim, and as is also frequently found to be the case in wheels with a solid web that has no such curvature. Again, with cast steel of proper make we find that such curves in the web have, to a certain extent, a spring-like quality which gives to the wheel a very appreciable resiliency in service. The making of the rim of box-like shape, as shown, is also of great advantage, for these curved sections $c'$, $d'$, forming as they do the inner portion or open bottom of the rim and taking to themselves the shrinking strain, insure the outer face of the rim from being in any wise affected by such strains and consequently such face is at all times preserved perfectly shaped to receive and hold a tire. The box-like shape of the rim insures great strength in itself and when to this feature is added the curving of the webs where they merge into and form the inner part of such rim we have a wheel in which the rim is elastically supported, and is so constituted as not to be injuriously affected by the shrinkage strains that are bound to occur between the hub and the rim. Furthermore, the whole construction lends itself to the casting of a wheel the walls of whose parts are comparatively thin and of uniform thickness, which features contribute very largely to reliable foundry work.

That which we claim as our invention, and desire to secure by Letters Patent, is,—

1. A metal wheel, comprising a hub, a tire-supporting rim having a substantially flat tread portion and inwardly-directed flanges near the margins of such tread portion and integral therewith, forming an integral annular channeled rim-structure, oppositely-disposed curved members connected with said flanges and extending therefrom toward each other, their convex surfaces being toward the tread, and means connecting said curved members with the hub.

2. A metal wheel, comprising a hub, a tire-supporting rim having a substantially flat tread portion and inwardly-directed flanges near the margins of such tread portion and integral therewith, forming an integral annular channeled rim-structure, oppositely-disposed curved members connected with said flanges and extending therefrom toward each other, their convex surfaces being toward the tread, and separated members connecting said curved members with the hub.

3. A cast metal wheel, comprising a hub, a tire-supporting rim having a substantially flat tread portion and inwardly-directed flanges integral therewith, forming an integral annular channeled rim-structure, oppositely-disposed curved members cast integral with said flanges and extending therefrom toward each other, their convex surfaces being toward the tread, and means connecting said curved members with the hub.

4. A cast metal wheel, comprising a hub, a tire-supporting rim having a substantially flat tread portion and inwardly-directed flanges integral therewith, forming an integral annular channeled rim-structure, oppositely-disposed curved members cast integral with said flanges and extending therefrom toward each other, their convex surfaces being toward the tread, and separated members connecting said curved members with the hub.

ROBERT J. BURROWS.
EDWIN B. ROSS.

Witnesses:
M. M. VAULIN,
N. M. CARLETON.